United States Patent [19]  [11] 4,093,155
Kincaid, Jr.  [45] June 6, 1978

[54] STEAM POWERED TILTING ENGINE VTOL AIRPLANE

[76] Inventor: Elmo Kincaid, Jr., 1660 Ashley Dr., Clarkston, Wash. 99403

[21] Appl. No.: 770,086

[22] Filed: Feb. 14, 1977

[51] Int. Cl.² .......................................... B64C 29/00
[52] U.S. Cl. .................................... 244/12.4; 244/56; 244/60; 416/148; 416/171
[58] Field of Search ................ 244/12.4, 7 R, 7 C, 244/60, 65, 66, 53 R, 56, 17.23; 416/171, 148, 121

[56] References Cited

U.S. PATENT DOCUMENTS

| | | | |
|---|---|---|---|
| 1,845,556 | 2/1932 | Peterson | 244/53 R |
| 2,183,151 | 12/1939 | Peterson | 244/53 R |
| 3,037,721 | 6/1962 | Stefanutti | 244/7 R |
| 3,089,666 | 5/1963 | Quenzler | 244/7 R |
| 3,181,810 | 5/1965 | Olson | 244/7 R |
| 4,032,084 | 6/1977 | Black | 244/17.23 |

OTHER PUBLICATIONS

Butz, "Soviets Study Nuclear Plane Concepts," Aviation Week, Jul. 13, 1959, pp. 64, 65, 67.

*Primary Examiner*—Barry L. Kelmachter
*Attorney, Agent, or Firm*—Chernoff & Vilhauer

[57] ABSTRACT

A vertical takeoff and landing airplane has a plurality of rotors which are positioned selectively about the center of balance of the airplane so that it can hover upon failure of any one of the rotors. Each rotor is driven by an associated steam propulsion unit and the rotors and propulsion units are constructed so that they may be tilted about their lateral axes from vertical lift positions to horizontal propulsion positions while the airplane is in flight. The working fluid upon which the propulsion units operate is supplied from two or more combustion centers which are separated from the propulsion units, and which produce a high pressure steam-combustion product mixture, automatically at a constant pressure, which is routed to a common pressure system for powering the individual propulsion units. Should one of the fuel combustion centers fail, the steam pressure requirements are provided for automatically by the remaining fuel combustion centers.

10 Claims, 15 Drawing Figures

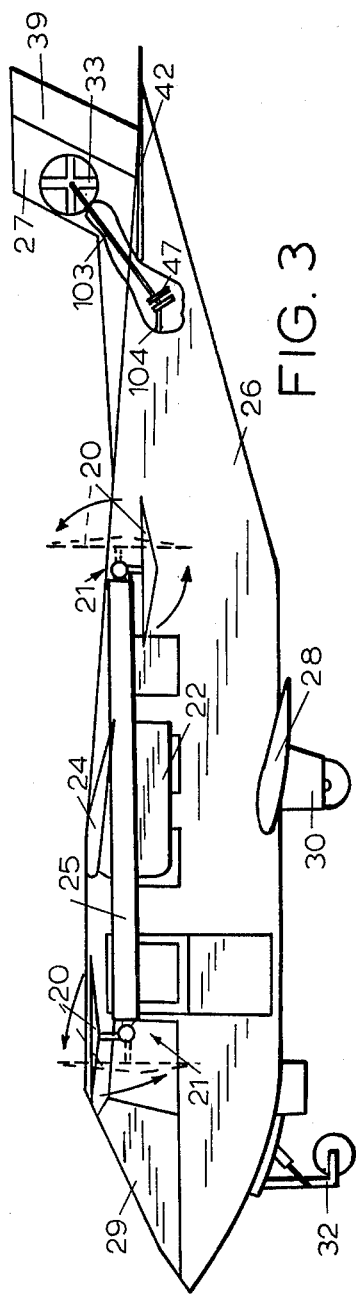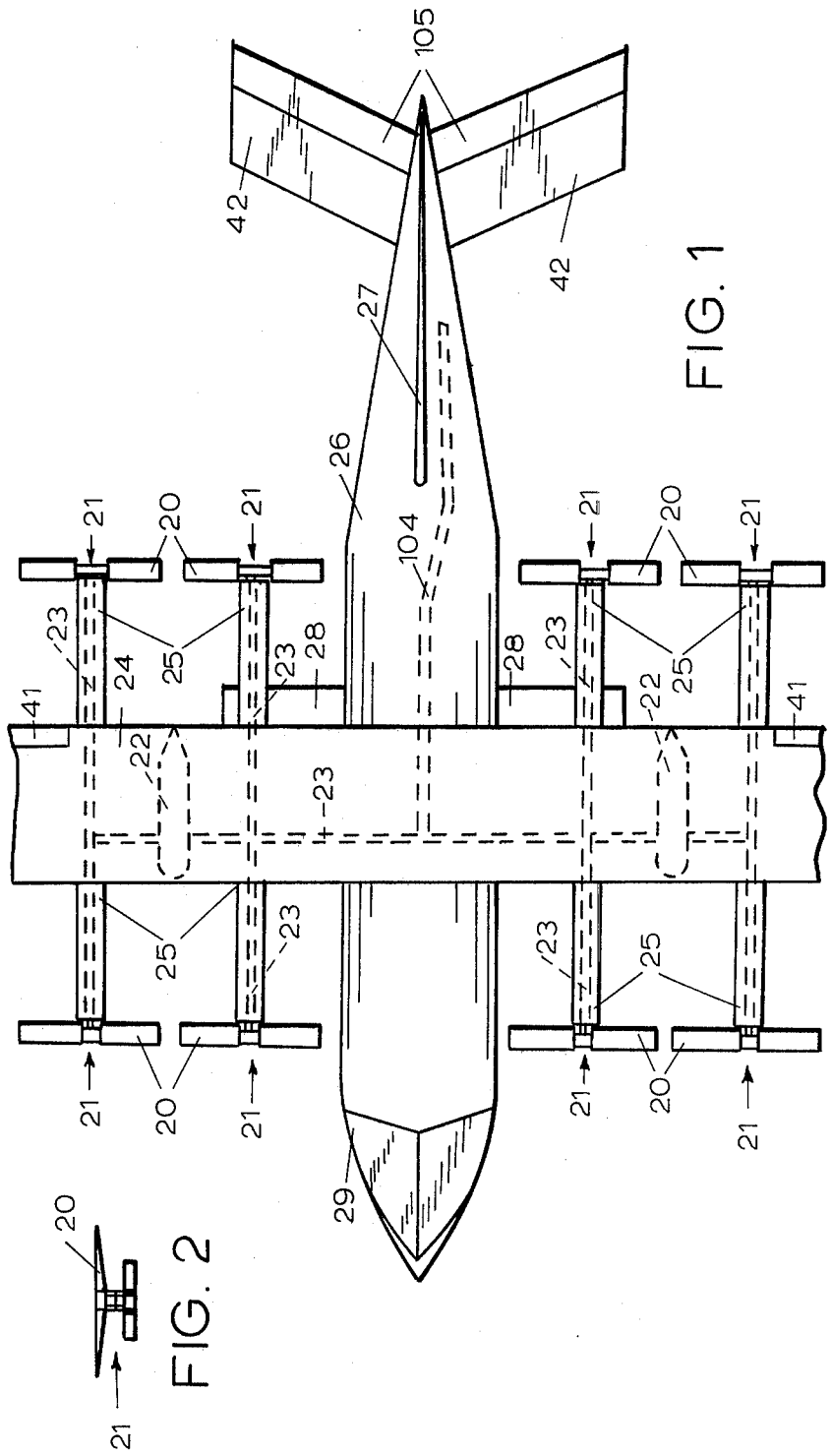

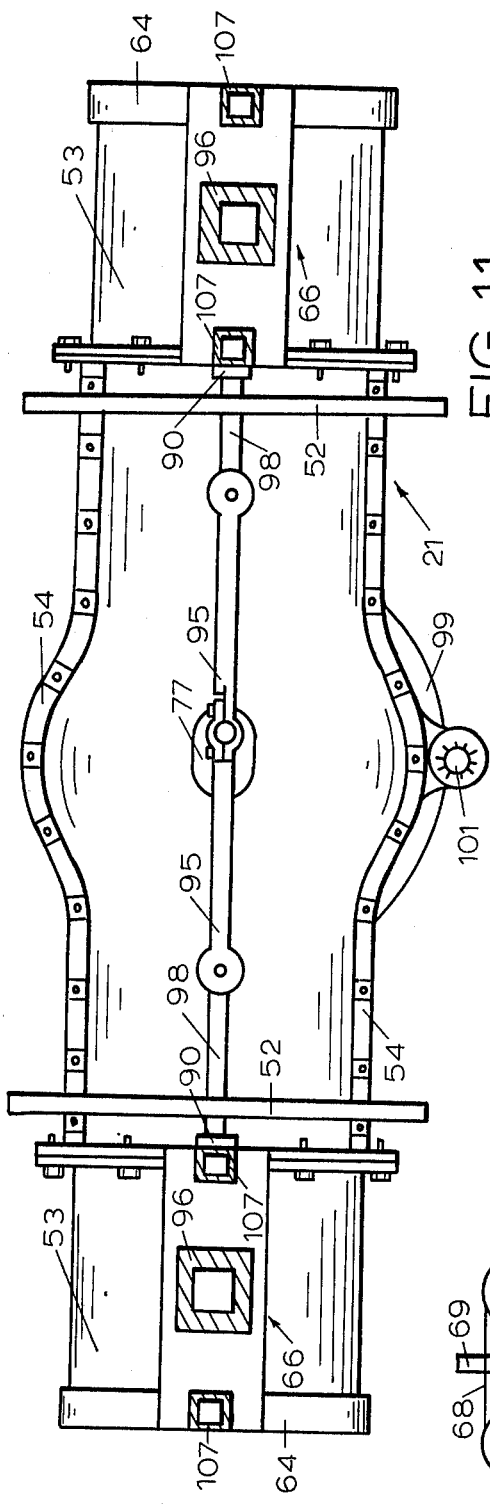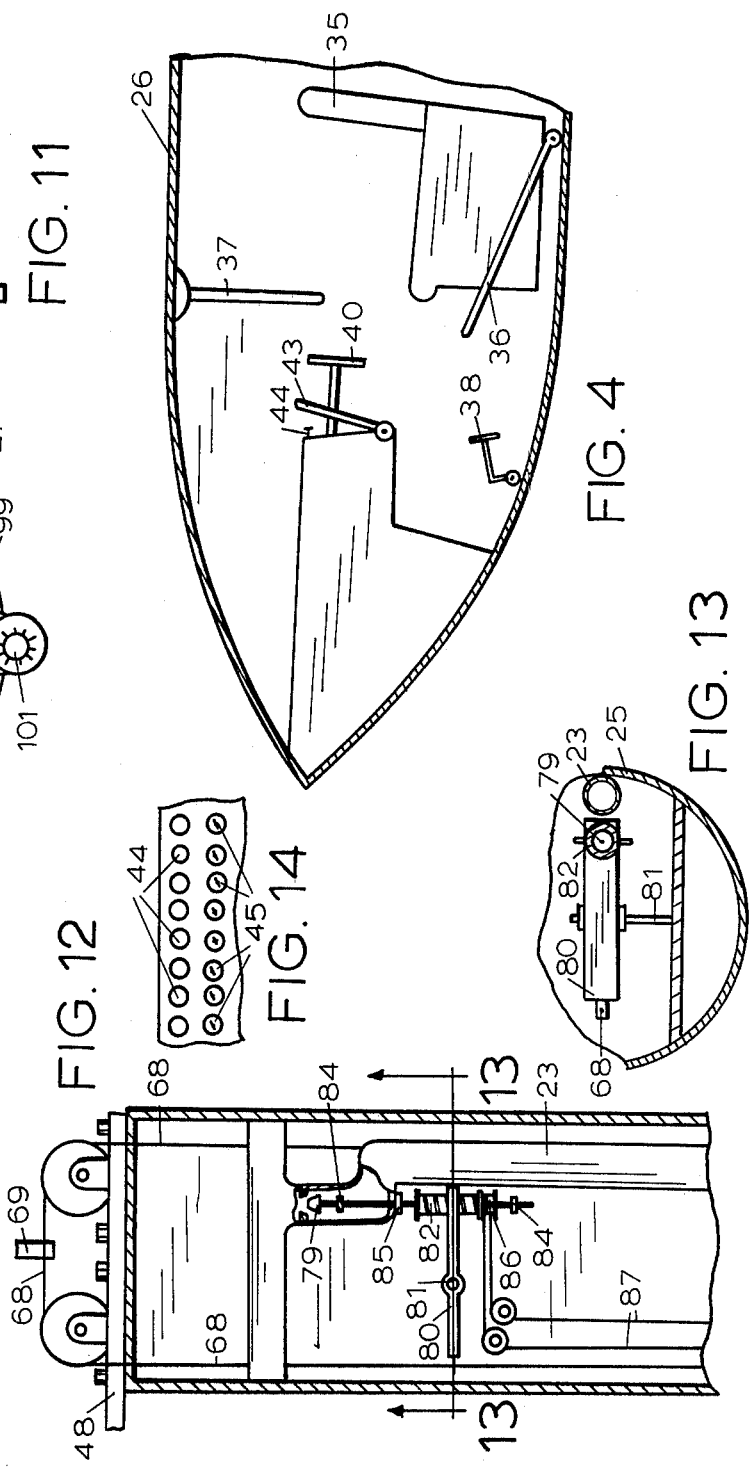

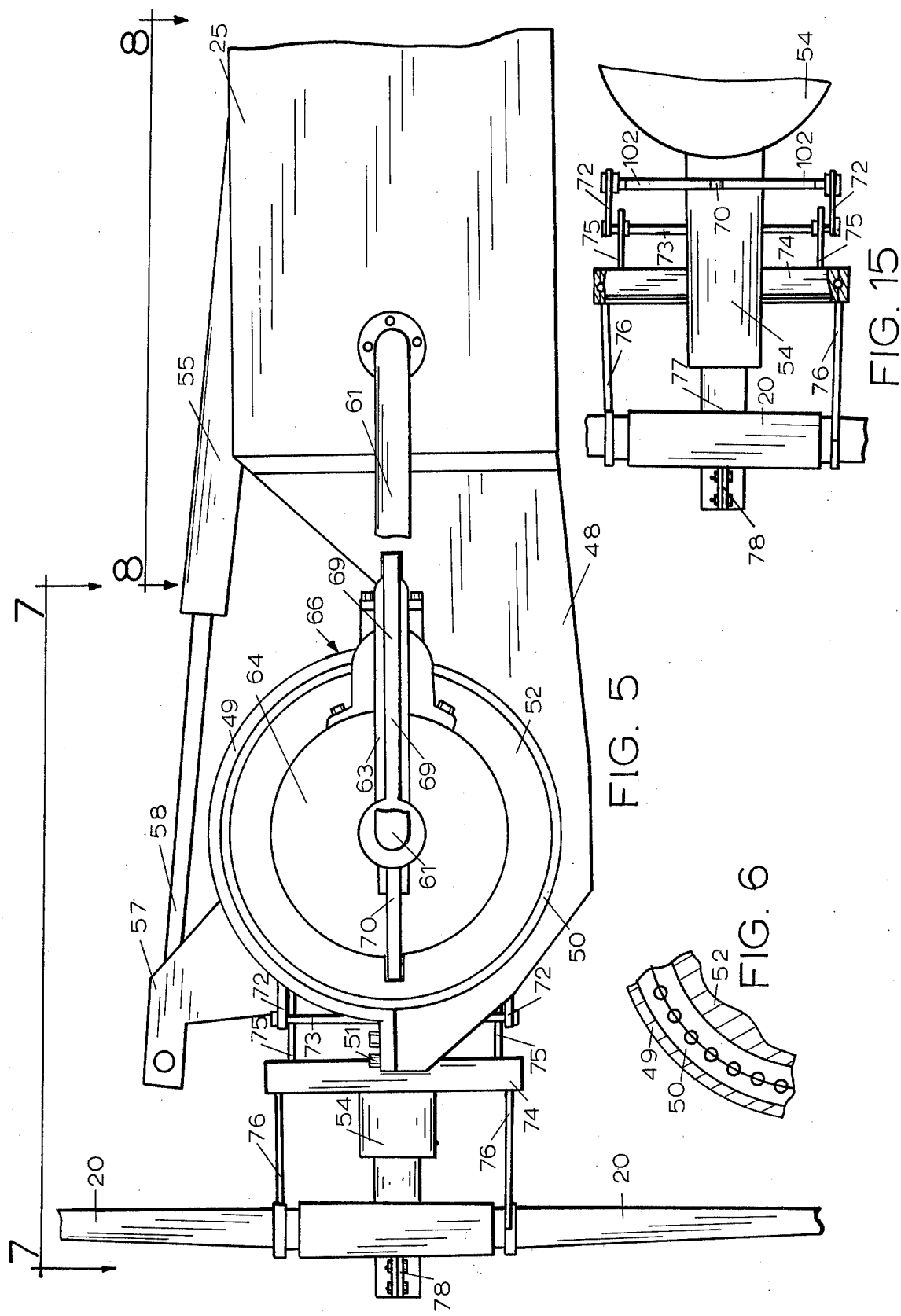

STEAM POWERED TILTING ENGINE VTOL AIRPLANE

BACKGROUND OF THE INVENTION

This invention relates to a VTOL airplane. It pertains in particular to such an airplane having a plurality of steam powered tiltable propulsion units which are supplied high pressure working fluid from common combustion centers.

The use of tilting engines is known in VTOL airplane art. In particular, U.S. Pat. No. 3,089,666 teaches the concept of utilizing a plurality of tilting engines. However, the prior art airplanes of this class use conventional internal combustion engines. The use of existing engines in this manner requires large support and actuation mechanisms which are expensive to fabricate, complex in operation and add considerably to the weight of the airplane.

In a second class of VTOL airplanes only the propellers or rotors are rotated while the engine remains fixed. This requires the use of a flexible connector between the engine and rotor which will accommodate the angular change therebetween. Connectors of this type are undependable and prone to failure.

In a third class of VTOL airplanes the engines are mounted on the forward edge of the wing and the entire wing is tipped to a vertical position for takeoff. Again this requires complex mechanisms which add to the cost and reduce the reliability of the airplane. Also, aerodynamic control is sacrificed during the transition between forward and hover flight.

THE DRAWINGS

The manner in which the foregoing and other objects of the invention are accomplished will be apparent from the accompanying specification and claims, considered together with the drawings wherein:

FIG. 1 is a fragmentary plan view of the airplane of the present invention;

FIG. 2 is a view in side elevation of one of the rotors and propulsion units used to power the airplane;

FIG. 3 is a view in side elevation of the airplane of FIG. 1, partially broken away to show hidden construction, showing the rotors and propulsion units rotated to their vertical positions for forward flight in broken line;

FIG. 4 is a fragmentary, semi-diagrammatic sectional view in side elevation, of the forward portion of the airplane showing its cockpit and controls;

FIG. 5 is a fragmentary view in side elevation, of one of the propulsion units and rotors partially broken away to show hidden construction;

FIG. 6 is a fragmentary detailed sectional view, at an enlarged scale, of one of the bearings on which the propulsion units are mounted;

FIG. 11 is a view in rear elevation of the propulsion unit with parts removed to show concealed construction;

FIG. 12 is a fragmentary sectional view of one of the struts upon which the propulsion units are mounted with portions removed for clarity;

FIG. 13 is a fragmentary sectional view taken on the line 13—13 of FIG. 12;

FIG. 14 is a fragmentary detailed view of a section of the control panel of the airplane; and FIG. 15 is a fragmentary detailed view of the propeller pitch control of the engine of FIG. 5, partially broken away to show hidden detail.

GENERAL STATEMENT OF THE INVENTION

Figure 7:
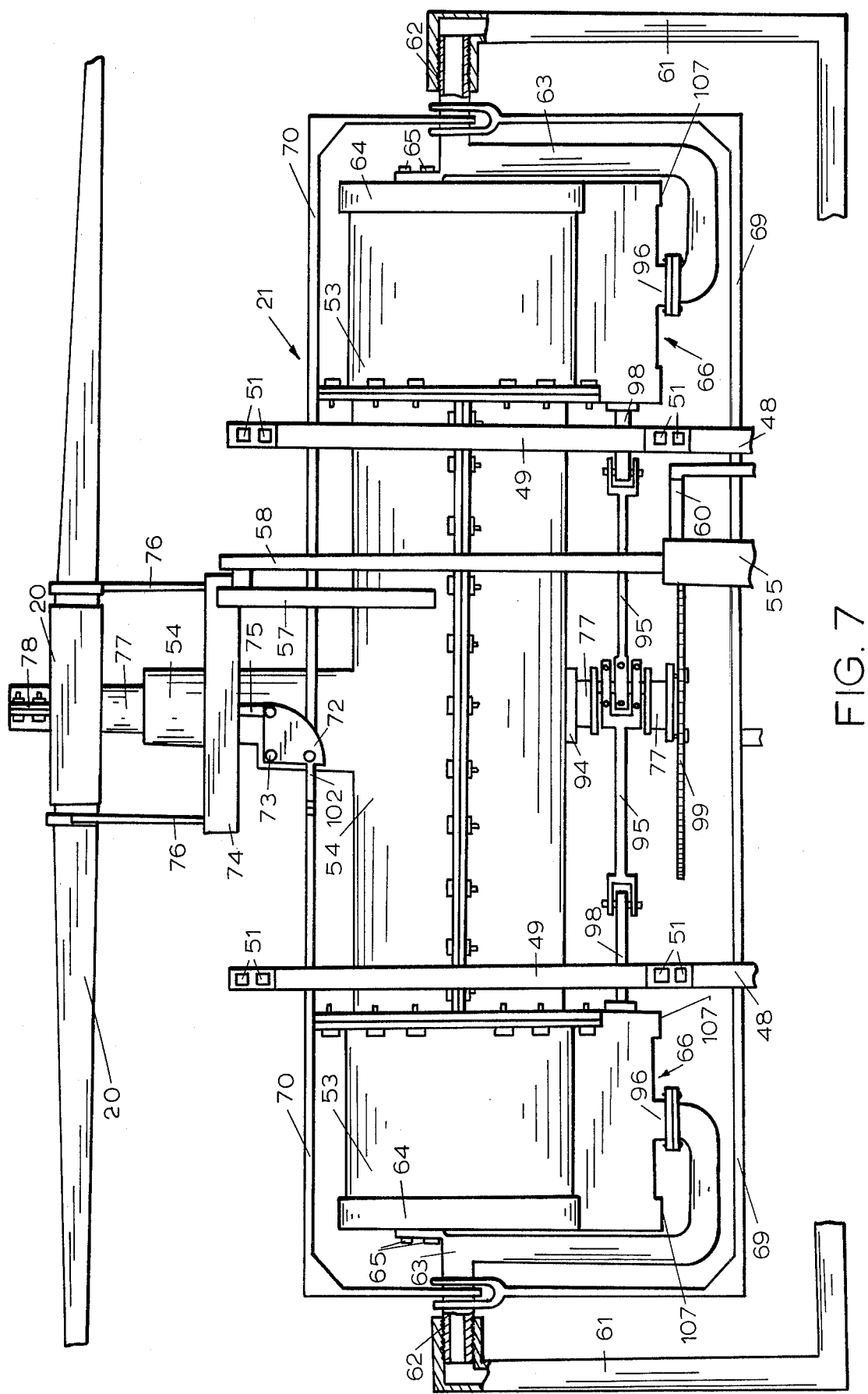
FIG. 7 is a fragmentary plan view of one of the propulsion units with its rotors rotated 90°, taken on line 7—7 of FIG. 5 looking in the direction of the arrows, partially broken away to show hidden construction.

In the present invention fuel is combusted in fuel combustion centers making a working fluid comprising a mixture of steam and combustion products which is routed through the wings and struts of the airplane to power a plurality of propulsion units. The propulsion units each have two horizontally opposed cylinders with double acting pistons and are tiltable on their lateral axes for hover flight. The propulsion units are arranged fore and after the wings for pulling and pushing the airplane respectively. They are mounted pivotally with means for tilting the forward engines upwardly and the rearward engines downwardly; thus creating vertical thrust for hover flight. Controls are provided for tilting the engines, varying their propeller pitch collectively and individually, and varying the amount of working fluid which is supplied to each engine.

DETAILED DESCRIPTION OF A PREFERRED EMBODIMENT

Referring to FIGS. 1 and 2 of the drawings, the invention generally comprises a conventional airplane having a fuselage 26, a wing 24, a vertical tail 27, and horizontal tails 42. A lower short sub-wing 28 mounts a main landing gear 30 and a nose gear 32 is mounted on the fuselage. A large high visibility windshield 29 is located at the front of the fuselage.

Mounted fore and aft of the wing by means of struts 25 are eight rotors 20 each individually powered by a two-cylinder horizontally opposed steam powered propulsion unit 21. Working fluid for the propulsion unit is provided by combustion centers 22 which are mounted below the wing 24 on each side of the fuselage. Steam supply piping 23 is mounted inside the struts and wings for distribution of the working fluid from the combustion centers to the propulsion units.

The propulsion units each comprise two opposed cylinders 53 mounted on a crank case 54 and covered by heads 64. The propulsion units, best shown in FIGS. 7, 9, 10 and 11, are mounted pivotally in supports 48 by means of bearings 50. The supports in turn are attached to the ends of struts 25 which are mounted under the wings of the airplane. The bearings are attached to circular mounting bosses 52 which are integral with crank case 54. Pairs of straps 49 fit over the bearings securing the propulsion units in the supports. The straps 49 are secured by bolts 51 which fix both of their ends to the supports.

The propulsion unit are tilted in the bearings by steam driven piston-cylinders 55 which are operated through control valves 56 for moving the propulsion units between horizontal positions for forward flight and vertical positions for hover. Crank case castings 57 mount the rams 58 of the piston-cylinders and the cylinders are mounted to struts 25. Cable controls 59 for operating the control valves extend to the cockpit of the airplane where they are connected to an engine tipping handle 43. Steam is supplied to and from valves 56 by pipes 60.

Figure 10:
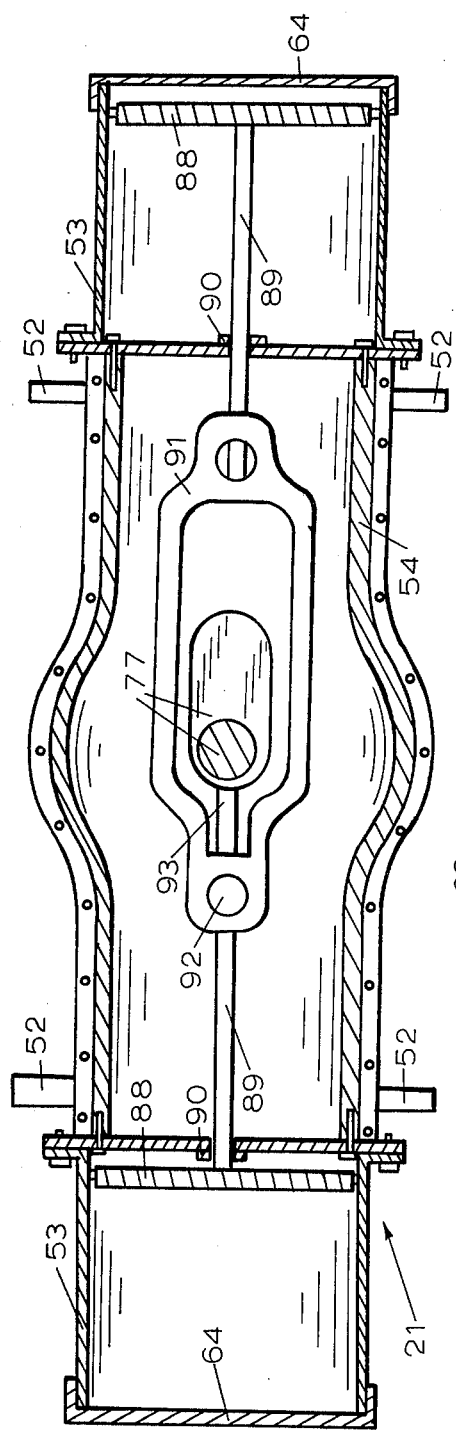
FIG. 10 is a vertical sectional view of the propulsion unit taken on the line 10—10 of FIG. 9.
Figure 9:
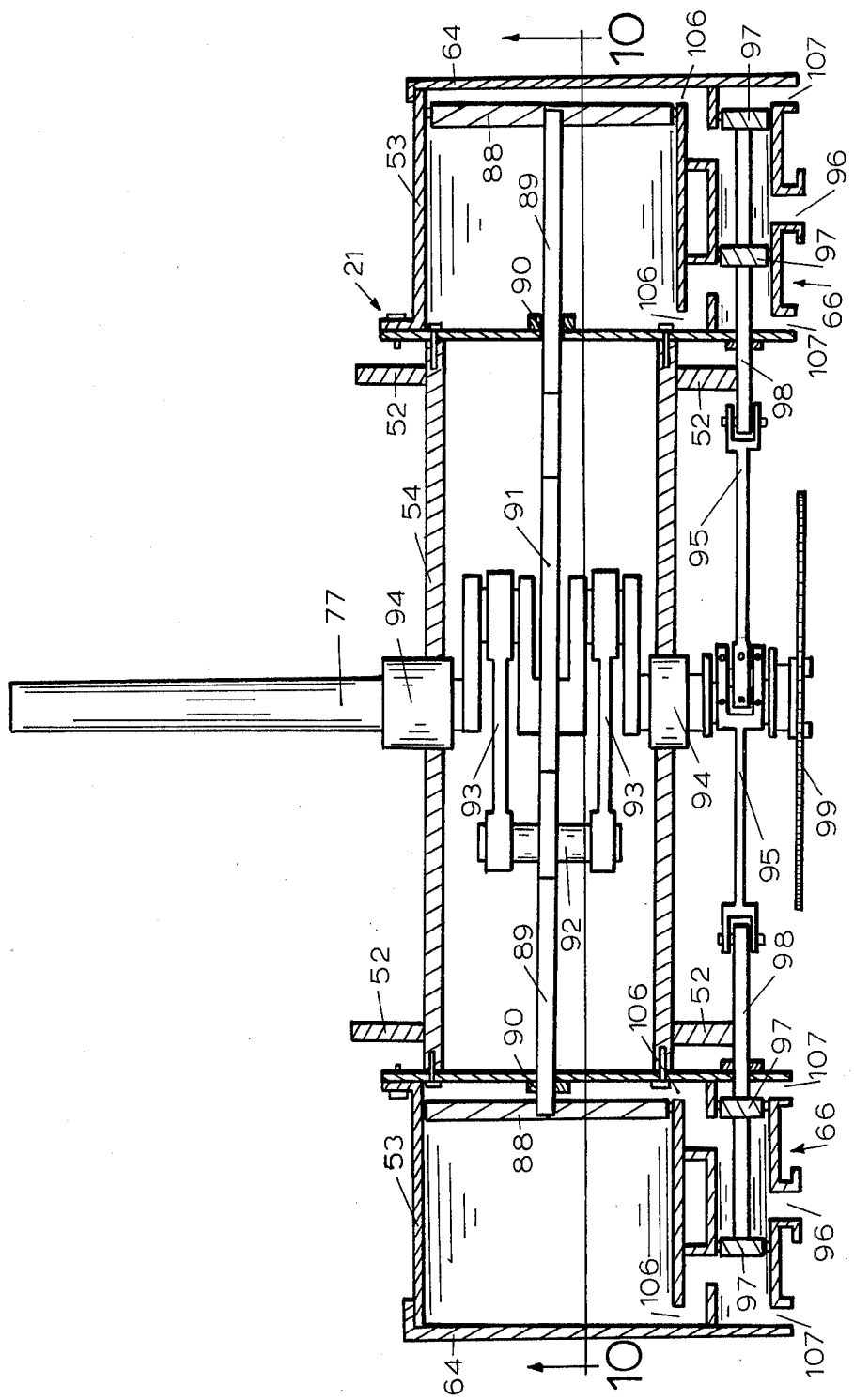
FIG. 9 is a horizontal sectional view of one of the propulsion units.

Slidably fitting within the cylinders 53 of each engine are double-acting steam pistons 88 which are attached to the outer ends of activating shafts 89, FIGS. 9 and 10. The shafts pass through steam pressure seals 90 located at the inner end of each cylinder 53, and are connected at their inner ends to the opposite ends of a crank shaft bypassing spacer 91. Attached to one end of the crank shaft bypassing spacer is a wristpin 92 which is journaled in one of the ends of paired connecting rods 93. The other ends of the connecting rods are joined rotatably to eccentric journals of crank shaft 77. Bearings 94 journal the crank shaft in the crank case 54.

Steam piston control valves 66 for monitoring the steam input to the cylinders are mounted on the sides of each cylinder. They comprise outer ports 96 which allow steam to pass into the body of the steam valves from where it passes to the cylinders through inner ports 106. Pistons 97 are mounted at end and intermediate locations on shafts 98 for uncovering alternately the set of ports 96 and 106 on one side or the other of the steam pistons 88 in synchronization with the movement of the steam pistons. Vents 107 pass spent steam out of the valves. Connecting rods 95 interconnect shafts 98 and the crank shaft. The connecting rods are connected eccentrically to the crank shaft to provide reciprocative movement.

A light weight fly wheel 99, FIGS. 7 and 9, is attached to the rear end of the crank shaft 77 for moving the propulsion unit off of dead center when its connecting rods 93 are aligned and the propulsion unit will not turn upon application of steam. An electric starter motor 101 mounted on each propulsion unit and connected to a switch in the cockpit (not shown), moves its associated propulsion unit off dead center position so that it will operate when steam is applied The rotor 20 is attached to the other end of crankshaft 77 by clamp 78.

In the embodiment illustrated two fuel combustion centers 22 are provided. They respond automatically to the demand for working fluid by the propulsion units and in the event that either one of them fails the other one automatically increases its output to maintain the supply. In order to even out the flow, working fluid from both combustion centers is supplied to plenums (not shown) from where it is supplied to the propulsion units. Combustion centers of this type are covered in a separate patent application and are not a part of the instant invention per se.

The common supply system of working fluid provides uninterrupted flow to the propulsion units resulting in a steady lift of the airplane while in hover flight, which is the most dangerous maneuver of an airplane of this type. Should a failure occur while in this mode, the airplane would drop immediately. Due to this possibility the airplane preferably is provided with at least eight selectively positioned, individually powered rotors. Thus it can fly on any seven of the eight in case one of the propulsion units or rotors fail. In this way the airplane may continue to hover and land under control on the seven rotors and propulsion units remaining in operation. It is to be noted that the individually powered rotors are located selectively ahead of and behind the center of balance of the airplane and to either side of the center of balance so that the airplane is stable and controlable in the hover mode even with one propulsion unit inoperative.

Referring to FIG. 1, the piping 23 for the working fluid is contained in the wings 24, fuselage 26 and struts 25. Pivotal supply pipes 61, FIG. 7, connect with piping 23 and extend to connection with the outer ends of cylinders 53. Engine pipes 63 which are mounted on the cylinder heads 64 by bolts 65 are connected to steam piston control valves 66. The engine pipes are rotatably connected to supply pipe 61 at threaded joint 62. These joints are of corrosion resistant metal and make a good connection of a rotatably nature.

Poppet valves 79, FIG. 12, are located in piping 23 in each strut for controlling the amount of working fluid which is supplied to each propulsion unit according to its individual requirements. Each poppet valve is operated by a cable 68 which also controls the pitch of the rotor associated with that propulsion unit. Referring to FIGS. 12 and 13, one cable 68 is connected to one end of a lever 80 which is connected pivotally intermediate its end on a support pin 81. The other end of lever 80 has a threaded opening which fits over a threaded supply spool 82. The spool 82 is engaged to the stem of the poppet valve 79. The valve stem passes through a guide 84 and pressure seal 85 in the piping 23. The supply spool 82 has a cable spool 86 attached to one end upon which cable 87 is wound. Thus when the cable is translated the supply spool is rotated translating it and the poppet valve 79 in lever 80.

As noted, the poppet valve and the pitch of the associated rotor operate simultaneously so that loading on the rotor and the amount of working fluid supplied to the propulsion unit are coordinated to give a constant speed for a given throttle setting.

Figure 8:
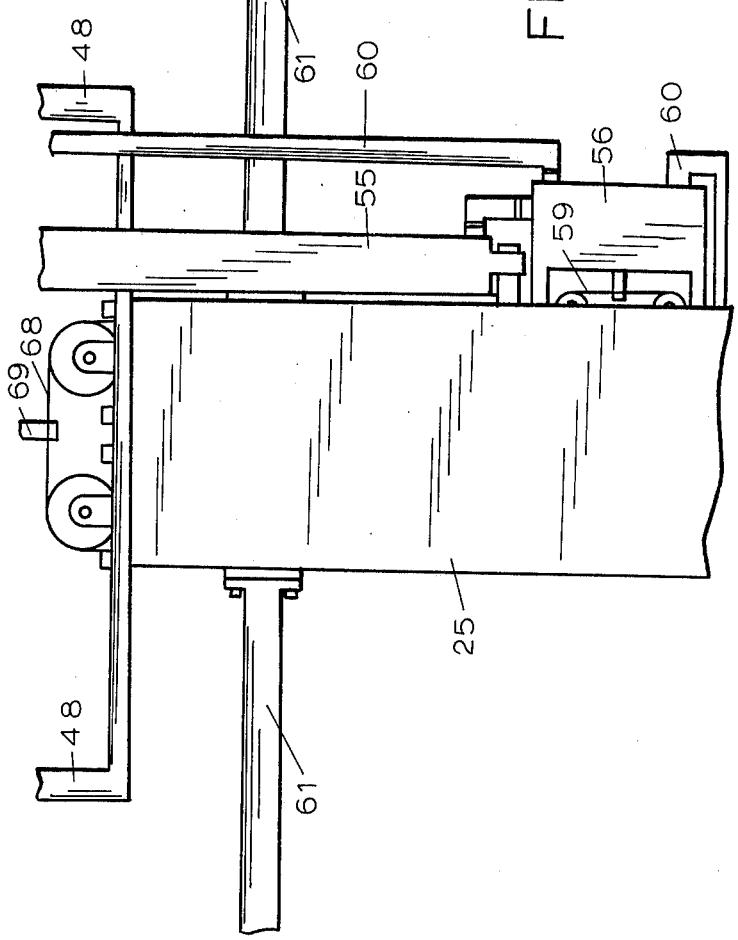
FIG. 8 is a fragmentary plan view taken on line 8—8 of FIG. 5 looking in the direction of the arrows.

As cables 68 extend out of struts 25, they are attached to stationary control elements 69, FIGS. 7 and 8. The control elements are connected to shafts 70 which are attached to the propulsion units and tip with them. The shaft and control elements both are rotatably and slidably connected to the supply pipe 63 allowing them to be translated back and forth upon operation of the control cables. Thus the control elements remain stationary with the engine supports and the shafts are supported by the propulsion units and rotate with them. As a result, control over rotor pitch is continuous during rotation of the propulsion units.

Referring to FIGS. 5, 7 and 15, rocker plates 72 transfer the side-by-side motion of shafts 70 by pivoting on rocker pins 73. Action arms 102 interconnect the shafts to the rocker plates. Shafts 75 connect the rocker plate 72 to rotor pitch control bearing 74 through control link 76 transmitting the motion to the moving rotors 20.

A tail rotor 33 is located in tail 27 and is driven by a drive shaft 103 which extends from a small two cylinder steam engine 47 which is located in the rear section of fuselage 26. A steam line 104 interconnects piping 23 and engine 47. Steam is supplied to this engine only when all of the propulsion units 21 are in their vertical lift positions requiring the airplane to be turned in the hover mode. A valve (not shown) controls this action.

The cabin interior is shown in FIG. 4 with the controls centered around the pilot's seat 35. A collective pitch control handle 36 is used for increasing the pitch of all the rotors for raising the airplane, or for decreasing the pitch of all rotors for descending the airplane while in hover flight. This control is comparable to the collective pitch stick on a helicopter. A selective pitch control stick 37 extends downwardly from the cabin roof and is used for bearing the pitch of the rotors selectively so that the airplane may be flown forward to the rear or sideways while in hover flight.

As noted the collective pitch control 36 is used to increase the pitch of all the rotors simultaneously to increase the overall lifting force imparted to the airplane. The selective pitch control stick 37 is used to vary the pitch of the individual rotors in order to effect balance while in hover flight. Both of these controls operate through cables 68 which are interconnected to each other in the cockpit for cooperative activation. Interconnections of this type are commonly done in prior art multi-engine helicopters and the details of interconnection is not shown. It is to be noted that some of the elements which operate in connection with the rear propulsion units will be oriented directly opposite from those of the front propulsion units.

Knobs 44, FIG. 14, one for each propulsion unit, operate the cables 87 to adjust the amount each poppet valve 79 is open to control flow of the working fluid to the propulsion units. Tachometers 45, located below knobs 44, indicate the speed of the individual propulsion units. The supply spools 82 are mounted on their associated poppet valve 79 so that they also move the valve stems when the levers 80 are moved by the propeller pitch control cables 68. Thus engine speed can be controlled by the knobs 44 and is automatically altered in connection with pitch when stick 37 or handle 36 is operated.

Rudder pedals 38, one for each foot, operate the reversible pitch tail rotor 33 so that the pilot can turn the airplane while in hover flight. In addition they control the rudder 39 of the airplane during airplane flight. The normal airplane control wheel 40 is used for controlling the movement of ailerons 41 and the elevators 105 for normal airplane flight control. In airplane flight the control wheel 40 and the rudder pedal 38 are used. The control stick 37 is not used in the airplane flight mode. The handle 36 is used in airplane flight to control the collective pitch of the rotors, now functioning as propellers.

A rotational lever 43 controls the position of the propulsion units. Pushing the lever forward activates control valves 56 causing all the propulsion units and the rotors to tip from their vertical lift positions to their horizontal propulsion positions. In this way the airplane changes from hover flight to airplane flight.

In operation the airplane ordinarily will hover and climb vertically until altitude is gained, then it will be flown forward while remaining in the hover mode by varying the pitch of the rear rotors with respect to the front rotors. The pitch of the rotors at the rear is increased and the pitch of the rotors in front is decreased so that the airplane still hovers while the rotors are facing slightly forward. Thus the airplane also is moved forward as well as being supported in the air. In this way the airplane may be tipped in whatever direction the pilot desires.

When sufficient forward velocity is achieved for the wings to begin to generate lift, handle 43 is pushed forward rotating all of the propulsion units and their respective rotors to their horizontal propulsion positions. Then the airplane operates as a regular airplane and flies on its wings. The propulsion units ahead of the wings are oriented so that their rotors pull the airplane and those to the rear of the wing push the airplane.

As the airplane is slowed down the propulsion units again are moved to their vertical lift positions and the wing loses its lift. The propulsion units and their respective rotors take over the support of the airplane in the hover mode once more.

Having thus described my invention in a preferred embodiment, I claim:

1. A VTOL airplane having fixed wings with a plurality of propulsion units supported on struts distributed about the center of gravity of the airplane, and having multi-bladed rotors interconnected to and driven by each propulsion unit in a manner for generating thrust when the propulsion units are operated, the propulsion units being mounted rotatably to the wings of the airplane for movement between forward flight positions and hover positions, including means for rotating said propulsion units between the forward flight position and the hover position, at least one working fluid generator fixedly attached to the airplane, and means for distributing the working fluid from the said generator to each of the propulsion units, each propulsion unit comprising:
    (a) two cylinders horizontally opposed, said cylinders being mounted on opposite sides of a crankcase,
    (b) a plurality of bosses surrounding said crankcase,
    (c) radial bearings received by said bosses, to surround and support the propulsion unit, said bearings having an axis of rotation substantially parallel to said cylinders, and
    (d) each of said cylinders having a cylinder head and a working fluid supply pipe connected thereto by means of a rotary joint which is coaxial with said radial bearings.

2. The aircraft of claim 1 wherein said rotating means includes means for rotating each said propulsion unit comprising a steam-driven cylinder and a ram within the steam-driven cylinder, said steam-driven cylinder and ram connected respectively to the supporting strut and to the respective propulsion unit, and powered by direct utilization of a portion of the working fluid produced by said generator.

3. The aircraft of claim 1, further comprising means for controlling the pitch of the blades of each rotor.

4. The aircraft of clain 3, wherein the means for controlling rotor blade pitch comprises a rotatable mechanical coupling surrounding each said working fluid supply pipe to transmit motion to a pitch control bearing attached to the rotor.

5. The aircraft of claim 1, wherein each propulsion unit further comprises:
    (a) said two opposed coaxial cylinders,
    (b) a double-acting piston slidably located within each cylinder,
    (c) an activating shaft connected to each piston,
    (d) a steam pressure seal on each cylinder, arranged for passing the associated activating shaft,
    (e) a crankshaft bypassing spacer, fixedly attached to and connecting said activating shafts,
    (f) a crankshaft having a plurality of eccentric journals; and
    (g) a pair of connecting rods located on opposite sides of the bypassing spacer, one end of said connecting rods being pivotally connected to one end of said bypassing spacer and the other end being attached to the crankshaft by said eccentric journals so as to convert reciprocal motion of the pistons to rotary motion of the crankshaft, and
    (h) a wrist pin arranged for interconnecting said connecting rods with said bypassing spacer.

6. The aircraft of claim 1 including piston valves operated by rods connecting each valve to said crankshaft of each propulsion unit in a manner for respectively admitting and exhausting the working fluid from the associated cylinder.

7. The aircraft of claim 1 further comprising a flywheel mounted on the crankshaft of each propulsion unit, and an electric starter motor which selectively engages the flywheel to move the propulsion unit off dead center during starting.

8. The aircraft of claim 3 further comprising a poppet valve means located in each said working fluid supply pipe for controlling the amount of working fluid supplied to each propulsion unit, and cable means for operating said poppet valve means.

9. The aircraft of claim 8 further comprising means for maintaining constant rotor speed of each propulsion unit while varying rotor blade pitch.

10. The aircraft of claim 9 wherein the means for maintaining constant rotor speed comprises a lever having a centrally located pivot point, one end of said lever being connected to said poppet valve means, and a cable connected to the other end of said lever for simultaneously operating said lever and pitch control means, when said cable is moved by control means in a cockpit of said airplane.

* * * * *